United States Patent [19]

Baba et al.

[11] Patent Number: 4,781,445
[45] Date of Patent: * Nov. 1, 1988

[54] OPTICAL DEVICE HAVING POSITIONALLY CHANGEABLE OPTICAL SURFACES AND A METHOD OF VARYING AN IMAGE FORMING POSITION

[75] Inventors: Takeshi Baba; Takashi Serizawa; Masayuki Usui, all of Yokohama; Hiroyuki Imataki, Kawasaki; Hiroyasu Nose, Tokyo, all of Japan

[73] Assignee: Canon Kabushiki Kaisha, Tokyo, Japan

[*] Notice: The portion of the term of this patent subsequent to Nov. 8, 2005 has been disclaimed.

[21] Appl. No.: 615,546

[22] Filed: May 31, 1984

[30] Foreign Application Priority Data

Feb. 23, 1984 [JP] Japan .................................. 59-32999

[51] Int. Cl.⁴ .......................... G02B 7/02; G02B 1/06; G02B 15/00; G02B 5/04
[52] U.S. Cl. ..................................... 350/409; 350/247; 350/286; 350/419; 350/423
[58] Field of Search ............... 350/423, 409, 418, 419, 350/247, 286

[56] References Cited

U.S. PATENT DOCUMENTS

| | | | |
|---|---|---|---|
| 3,583,790 | 6/1971 | Baker | 350/423 |
| 3,617,116 | 11/1971 | Jones | 350/423 X |
| 4,097,126 | 6/1978 | Mahlein et al. | 350/164 X |
| 4,289,379 | 9/1981 | Michelet | 350/419 |
| 4,303,324 | 12/1981 | Marcus | 350/255 X |
| 4,444,471 | 4/1984 | Ford, Jr. et al. | 350/423 |
| 4,514,048 | 4/1985 | Rogers | 350/423 |

OTHER PUBLICATIONS

Caudell et al., "Active Optics with RTV Silcone Rubber," *SPIE*, vol. 115, Advances in Replicated & Plastic Optics, pp. 18–24.

*Primary Examiner*—John K. Corbin
*Assistant Examiner*—Scott J. Sugarman
*Attorney, Agent, or Firm*—Fitzpatrick, Cella, Harper & Scinto

[57] ABSTRACT

An optical device having an elastic body sandwiched between typically two optical surfaces, which are capable of changing relative positions through deformation of the elastic body. The two optical surfaces may be given by, for example, parallel flat plate glasses or lenses. By changing the distnace or relative positions between the two optical surfaces, focusing or correction of chromatic aberration of photographic lenses, etc. can be effected.

23 Claims, 6 Drawing Sheets

OPTICAL DEVICE HAVING POSITIONALLY CHANGEABLE OPTICAL SURFACES AND A METHOD OF VARYING AN IMAGE FORMING POSITION

BACKGROUND OF THE INVENTION

1. Field of the Invention

This invention relates to an optical device capable of changing relative positions of two or more optical surfaces 2. Description of the Prior Art Such an optical device, of which two optical surfaces are able to change their relative positions, as variable apex angle prism, variable thickness parallel flat plate, etc is useful for focusing or formation of anti-vibration optical systems. The devices of the prior art known as devices of this kind include a device in which a liquid is sealed between two parallel flat plate glasses, a device in which a liquid is sealed within a rubber film, sandwiched between two parallel flat plate glasses and deformed under pressurization, etc However, any of these devices employs a liquid, for which a liquid reservoir or a pressurizing device are required, thus posing many problems in miniaturization or production thereof.

It is also known to use a piezoelectric element as a deformation means, but such a device has the drawback that it can cause only a small amount of deformation.

SUMMARY OF THE INVENTION

An object of the present invention is to remove these drawbacks and provide an optical device capable of changing the relative positions of two or more optical surfaces in a large amount of change with a simple structure.

Another object of the present invention is to provide a material and a preparation method optimal for the above optical device.

Still another object of the present invention is to provide an optical system effectively using the above optical device of the present invention.

According to the present invention, two or more optical surfaces are able to cause large changes in relative positions thereof with a simple structure, and the device can be utilized effectively for various optical systems.

The optical device according to the present invention comprises an elastic body, and a plurality of relatively rigid holding members each providing an optical surface and holding in cooperation with each other the elastic body, a plurality of the optical surfaces being able to change their relative positions through deformation of the elastic body.

BRIEF DESCRIPTION OF THE DRAWINGS

FIG. 14 and FIG. 15, FIG. 16 and FIG. 17 are figures for explanation of the optical device of the present invention shown in FIG. 12, wherein FIG. 14 and FIG. 16 show front views, FIG. 15 and FIG. 17 back views;

DETAILED DESCRIPTION OF THE INVENTION

The optical device of the present invention is constituted of an elastic body and, typically, two optical surfaces sandwiching the elastic body therebetween. The optical surfaces may be given by relatively rigid holding members such as parallel flat plate glasses or lenses.

The holding members are usually rigid but need not be absolutely rigid as far as the elastic body preferentially deforms when an external force is applied to a combination of the elastic body and the holding members The number of the holding members is typically two but may be three or more.

Herein, the term "optical surface" is used to mean an artificially provided surface where an incident light flux receives some optical action such as, for example, refraction, reflection, diffraction and diffusion. Strictly speaking, each surface of holding members such a flat plates and lenses of glass or plastics forms an optical surface as defined above at a boundary with a contiguous medium such as an elastic body or air. Herein and in the accompanying drawings, however, a flat plate or a lens is described to have one optical surface for brevity of explanation while it actually has usually two optical surfaces concerned.

When the optical surfaces are formed of parallel flat plate glasses, it is possible to constitute a prism of which the apex angle is variable with the use of the optical device of the present invention. More specifically, by fixing two parallel flat plate glasses at respective one ends thereof, while applying an external force on the other ends, the elastic body can be deformed to change the apex angle of the prism. If the elastic body is made of a material as described hereinafter, a large amount of change in prism apex angle can be obtained by only a slight external force.

According to the optical device of the present invention, the image forming position can be made variable by changing the relative positions of the two optical surfaces sandwiching the elastic body therebetween. The positions of optical surfaces may be changed in any desired direction. For example, they can be changed in a direction in parallel with or perpendicular to the optical axis or changed so as to have directional components in both directions in parallel with and perpendicular to the optical axis.

Next, the material effectively used as the elastic body of the present invention are described.

The elastic body which can be utilized in the present invention may be any material which undergoes deformation when a force is applied thereto and returns to its original form before deformation, provided that the force applied is not too large (within the elastic limit), i.e. has an elasticity.

In ordinary solids, the maximum strain within the elastic limit (limiting strain) is about 1%. In contrast, in a vulcanized elastic rubber, the elastic limit is very large, with its limiting strain being as large as approximately 1000%.

In the optical device according to the present invention, any material having a desired modulus of elasticity corresponding to the characteristics of the optical device to be formed may be used. However, it is generally preferred to use a material with a smaller modulus of elasticity, in order to obtain easily a large elastic deformation or in order to make the state after deformation optically more homogeneous.

The modulus or elasticity (G) is represented by $G = \rho/\gamma$ (where $\rho$ = stress, $\gamma$ = elastic strain). An elasticity capable of giving a large deformation with a small stress is called as high elasticity or rubber elasticity, and therefore such kind of elastic body is preferably utilized in the present invention.

Such rubbery elastic bodies are generally known as "rubbers", including natural rubber, styrene-butadiene rubber (SBR), isoprene rubber (IR), ethylene-propylene rubber (EPM, EPDM), butyl rubber (IIR), chloroprene rubber (CR), acrylonitrile-butadiene rubber (NBR), urethane rubber (U), silicone rubber (Si), fluorine rubber (FPM), polysulfide rubber (T), polyether rubber (POR, CHR, CHC) and others. Among them, ethylene-rubber or silicone rubber which is transparent to visible light can be effectively used. Any of these rubbers is rubbery at room temperature. However, polymeric materials in general take either glassy, rubbery or molten state depending on the degree of the Browian movement. Accordingly, polymeric materials exhibiting rubbery state within the temperature range at which the optical device is used can be utilized as elastic bodies of the present invention. The modulus of elasticity under rubbery state can be determined depending on the degree of crosslinking of polymeric chains constituting the elastomer. Thus, vulcanization of natural rubber is nothing but a treatment which determines the modulus of elasticity.

The elastic body to be used in the present invention should desirably be deformed greatly with a small stress, and for this purpose it is important to control the degree of crosslinking.

However, reduction in elasticity (tendency to exhibit greater deformation with smaller stress) leads to, on the other hand, lowering in strength. Therefore, it is necessary to choose adequately an elastic body to be used so that the strength corresponding to the purpose of the optical device to be formed can be maintained. Also, modulus of elasticity is measured in various manners depending on the kind of stress under use of the optical device, for example, by measurement of tensile, flexural or compression strength.

The elastic body to be used in the present invention should have a modulus of elasticity smaller than $10^{11}$ to $10^{13}$ dyne/cm$^2$ of ordinary solid materials, appropriately not more than $10^8$ dyne/cm$^2$, preferably not more than $10^6$ dyne/cm$^2$, particularly preferably not more than $10^5$ dyne/cm$^2$. The lower limit should preferably be as small as possible, provided that the elastomer when constituting the optical device has a shape-retaining property, as different from liquids in general. In this regard, optical devices are used at room temperature in most cases but may sometimes be used at higher or lower temperatures. Thus, the above values for modulus of elasticity should be understood as those at the temperature at which the optical device is used.

Hardness or softness of an elastic body depends more or less on its elasticity. According to JIS K 6301, a simple method for evaluation of hardness of rubber is defined, in which a minute strain is given by a spring on a sample surface to measure its penetration.

However, if the elasticity is as low as $10^6$ dyne/cm$^2$ or lower, it cannot be measured according to the above method. In such a case, ¼ inch miroconsistometer is used and the measured value of penetration is used for evaluation.

Also, when the modulus of elasticity is small, it is difficult to determine its value according to "tensile-elongation" relationships and therefore its value is determined by compression (5% deformation). The value can be correlated to the penetration as previously mentioned.

Rubbery elastomers, other than the vulcanized (crosslinked) products well known in the art, are inclusive of ethylene-vinyl acetate copolymers and butadiene-styrene block copolymers which require no valcanization, or alternatively, they can be obtained by appropriate gelling (controlling the molecular chain length between the crosslinked points) of a chain polymer.

These rubbers are controlled in their elasticities by controlling their crosslinking degrees, combination of molecules in block copolymer or the state of gelling.

Also, instead of controlling the elastic body through the structure of the elastic body itself, its characteristics can be also changed or controlled by addition of a diluent or a filler.

For example, when a silicone rubber (KE-104, trade name, produced by Shinetsu Kagaku Kogyo K.K. and a catalyst (Catalyst-104, trade name, produced by Shinetsu Kagaku Kogyo K.K.) are added, hardness and tensile strength are lowered, while elongation increased contrarily, as the amounts of addition increase.

Such a material can have various moduli of elasticity depending on its density of crosslinking. If a particularly large deformation is desired, it is effective to use a polymer gelled with a small density of crosslinking. It is also possible to vary refractive index or dispersion by mixing various kinds of materials with the elastomer.

The elastic body to be used in the invention should preferably have a transmittance of above 80%, more preferably 95% or above when measured at a thickness of 1.0 cm by using a parallel plate transmission meter.

Next, useful methods for preparation of the optical device in the present invention are to be described.

Figure 1:
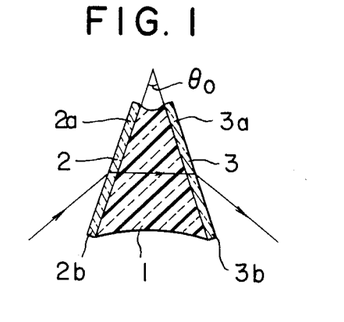
FIG. 1 and FIG. 2 are sectional views of an example of the optical device according to the present invention.
Figure 3:
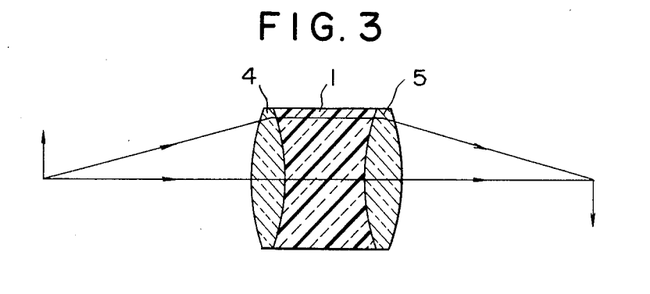
FIG. 3 and FIG. 4 are sectional views of another example of the optical device according to the present invention.

A first method comprises molding an elastic body into a shape approximate to that when no external force is applied thereto, and thereafter disposing parallel flat plate glasses or lenses to be attached thereto as shown in FIG. 1 or FIG. 3.

A second possible method is a cast molding method, comprising previously disposing lenses or parallel flat plate glasses in a lens barrel or an appropriate vessel and casting a monomer into the gap therebetween.

Thirdly, the surface and the vicinity thereof of an elastic body having a certain shape may be hardened to form an optical surface. For example, a monomer is poured into a vessel with a certain shape to effect casting therein, and after polymerization is carried out to some extent, hardening treatment such as UV-ray irradiation is applied to the vicinity of the surface. Alternatively, a hardened layer may be formed initially along the inner wall of the vessel and casting may be carried out within the hardened layer.

Now, a method for driving the optical device according to the present invention will be explained. The optical device can be driven easily by applying an external force on tis optical surface or another surface than the optical surface or inner portion of the elastic body.

A first method comprises applying mechanically a force by a screw or a cam, as utilized effectively in an optical system as shown below in FIG. 5.

A second method utilizes a piezoelectric element, as described below in FIG. 10.

A third method employs an electromagnet, and examples thereof are shown in FIGS. 12 through 17.

As still alternative methods, a stepping motor, thermal expansion, volume change during sol-gel transition due to change in temperature or pH, or shape-memorizing alloy may also be available.

Referring next to preferred embodiments of the present invention, the present invention will be further described.

Figure 2:
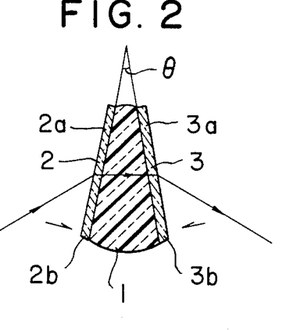

FIG. 1 and FIG. 2 show an example in which a prims is constituted with the optical device of the present invention, in which an elastic body 1 is sandwiched between parallel flat plate glasses 2 and 3 of which end points 2a and 3a are fixed, while the other end points 2b and 3b are movable by pressurization by an external force.

FIG. 1 shows the state when no pressure is applied to the points 2b and 3b, while FIG. 2 a state when a pressure is applied on the points 2b and 3b in the directions of arrows. Thus, by applying a pressure on the end points 2b and 3b, the apex angle of the prism changes from $\theta_0$ to $\theta$. By using a material as described before for the elastic body 1, a large amount of change in the prism apex angle can be obtained.

Figure 4:
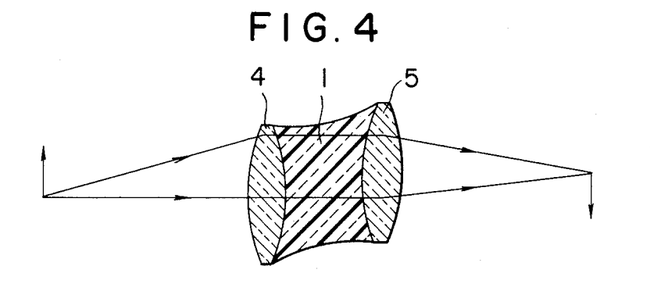

FIG. 3 and FIG. 4 show an example in which the optical surfaces are changed in parallel or perpendicular to the optical axis or so as to have components in both parallel and, perpendicular directions. Lenses 4 and 5 are disposed to sandwich the elastic body, and the lens 5 is movable in the direction perpendicular to the optical axis. FIG. 3 shows the state when the lens 5 does not move, and FIG. 4 a state when the lens 5 has moved in a direction perpendicular to the optical axis. As shown in the figures, since the image formed by lenses 4 and 5 can be moved in the direction perpendicular to the optical axis, such a device is useful for an anti-vibration optical system for preventing movement of images due to vibration of, for example, a TV camera.

Figure 5:
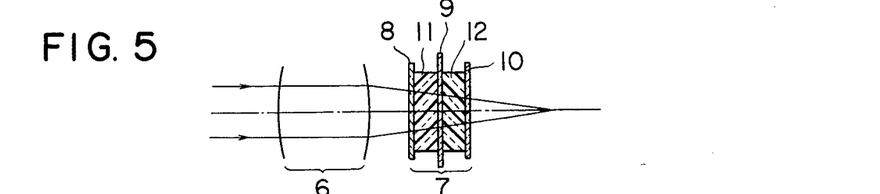
FIG. 5, FIG. 6 and FIG. 7 are each sectional view of an optical system for which the optical device of the present invention is applied.
Figure 6:
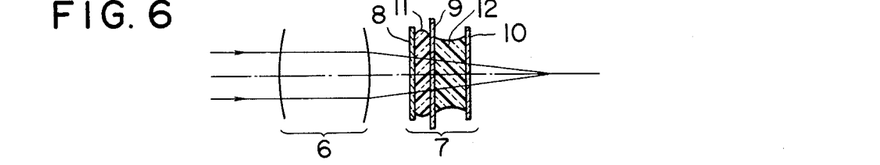
Figure 7:
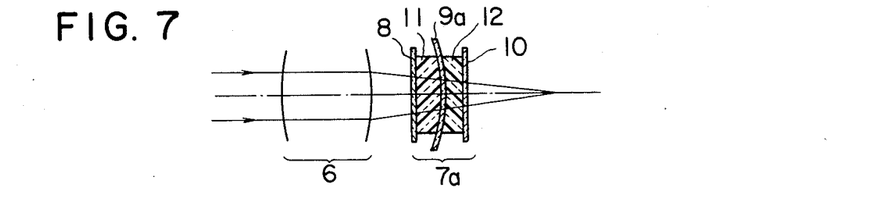

FIGS. 5 through 7 show applications for correction of chromatic aberration at the time of focusing of a photographic lens or magnification change of a zoom lens by changing the distance between the optical surfaces sandwiching an elastic body therebetween.

In FIG. 5 and FIG. 6, after a conventional lens system along the optical axis, an optical device or element 7 according to the present invention is disposed between the lens system and an image plane (not shown), and the optical element is constituted of parallel flat plate glasses 8, 9 and 10 and elastic bodies 11 and 12 having different dispersion characteristics. More specifically, the optical element of the present invention as shown in FIG. 5 and FIG. 6 is so constituted that it has a first elastic body 11, and a first optical surface and a second surface sandwiching the first elastic body 11 therebetween, the first optical surface and the second optical surface being able to change their relative positions through deformation of the first elastic body 11, further a second elastic body 12 connected to the second optical surface simultaneously with formation of a third optical surface which sandwiches the second elastic body together with the second optical surface, the relative positions of the second optical surface and the third optical surface being changeable through deformation of the second elastic body 12. The first optical surface is formed of a flat plate glass 8. The second optical surface is formed of a flat plate 9 in parallel with the plate 8. And, the third optical surface is formed of a flat plate glass 10 in parallel with the plates 8 and 9. The parallel flat plate glasses 8 and 10 are fixed on the lens barrel, and the parallel flat plate glass 9 is movable in the optical axis direction, its position in the optical axis direction being optimally determined by a helicoid or a cam in cooperation with a focusing mechanism through draw-out of the lens system 6 or a zoom mechanism by the cam. For example, suppose now that the refractive indices of the elastic bodies relative to the standard wavelength (e.g. d-line) are equally N, while those relative to a secondary wavelength (e.g. g-line) are $N_1'$ and $N_2'$ which are different from each other. Then, when the parallel flat plate glass 9 moves as shown in FIG. 5 and FIG. 6, the optical path relative to the standard wavelength is not changed and only the optical path relative to the secondary wavelength changed. By utilizing this, chromatic aberration on the axis can be corrected.

Depending on the uses, the parallel flat plate glass 8 or 10 may be made movable, or the elastic bodies 11 and 12 with different refractive indices relative to the standard wavelength ay be used, whereby a focusing function relative to the standard wavelength can also be given.

Alternatively, by imparting a curvature to the parallel flat plate glass 9, it is also possible to correct a chromatic aberration of a higher order.

Figure 8:
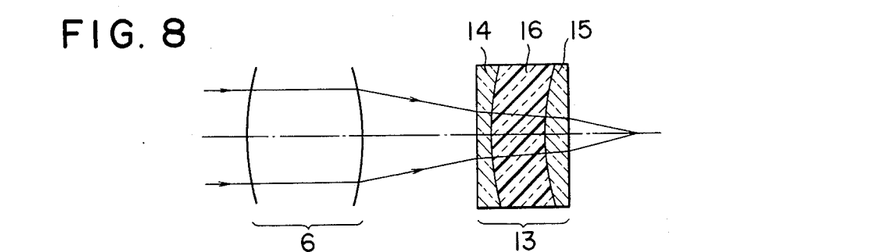
FIG. 8 and FIG. 9 are each sectional view of another optical system for which the optical device of the present invention is applied.
Figure 9:
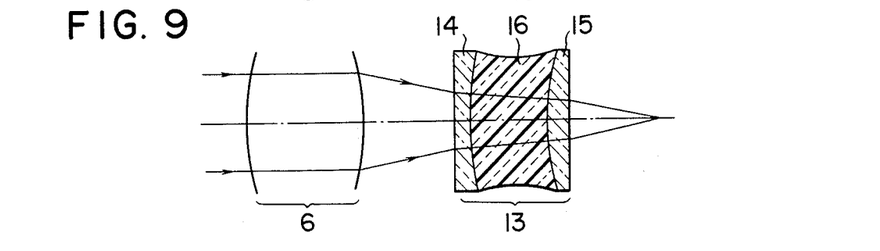

FIG. 8 shows an example in which the optical device of the present invention is used for focusing. A lens system 6 such as a photographic lens as described above, is combined with an optical device 13 of the present invention, consisting of a flat-concave lens 14 and a flat-convex lens 15 with flat surfaces facing outwardly and an elastic body 16 disposed therebetween. As shown in FIG. 8 and FIG. 9, the image forming position can be made variable, by changing the distance between the two lenses through deformation of the elastic body 16. At that time, if the elastic body 16 and the lenses 14 and 15 have refractive indices approximate to each other, the focusing function by the optical device 16 may be considered to be the change in optical path by the change in the thickness of the parallel flat plate glass, and the aberration change during focusing can be corrected by suitable choice of the curvatures of the two lenses 14 and 15, the refractive indices of the lenses 14, 15 and the elastic body 16, and dispersion characteristic of the elastic body 16. The lenses 14 and 15 may also be constituted of parallel flat plate glasses.

Figure 10:
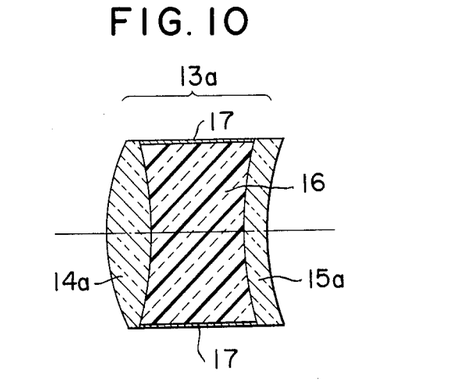
FIG. 10 and FIG. 11 are each sectional view of another example of the optical device of the present invention.
Figure 11:
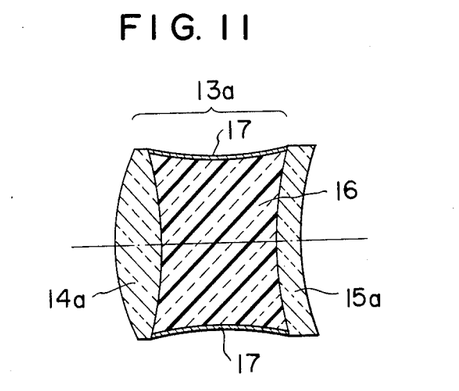

The optical device 13a of the present invention as shown in FIG. 10 and FIG. 11 is an example in which curvature is imparted to both surfaces of the lenses 14 and 15 of the element shown in FIG. 8. In FIG. 10 and FIG. 11, each of 14a and 15a is a lens having a curvature on the outside surface, 17 is a piezoelectric film such as of polyvinylidene fluoride, which can be deformed as shown in FIG. 11 by application of a voltage, and the focal length of the combined system of lenses 14a and 15a is made variable by movement of the lens 15a in the optical axis direction.

A zoom lens is a lens in which the focal length of a lens system is changed by changing the air distance between the lenses, but it is disirable from a viewpoint of optical designing that the thickness itself of the lens is variable. This is because the change in air distance will be accompanied with abrupt aberration change and, also with respect to chromatic aberration correction, the thickness change of the lens medium itself having dispersion can effectively be utilized. From these points of view, the device as shown in FIG. 10 and FIG. 11 is also useful as a constituent element of a zoom lens.

Figure 12:
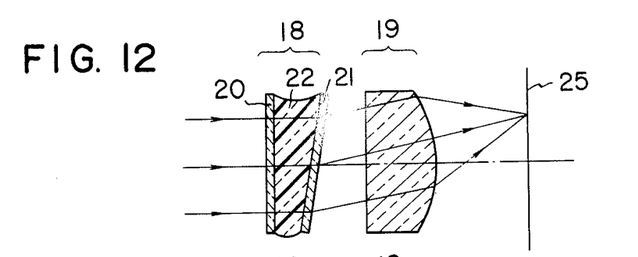
FIG. 12 and FIG. 13 are each sectional view of another optical system for which the optical device of the present invention is applied.
Figure 13:
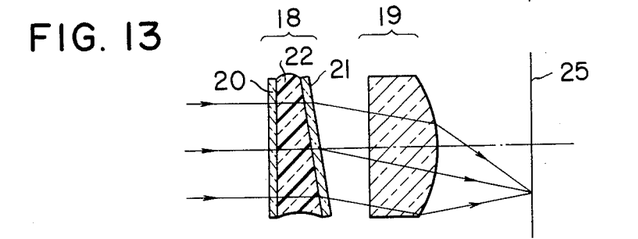

FIG. 12 and FIG. 13 show an example of an object lens system for pick-up for optical discs, using an variable apex angle prism as shown in FIG. 1. The variable apex angle prism 18 of the present invention consists of parallel flat plate glasses 20 and 21 and an elastic body 22. An object lens 19 forms an image by the incident laser beam on the recording surface 25 of the optical disc. The laser beam having formed the image is reflected with a change in polarized state subject to the information written on the recording surface at that position, returns conversely along a similar optical path to that of the incidence. The polarized state is detected by a detector, whereby the recorded information is read out. FIG. 12 shows a state where the image forming surface of laser beam moves upward, while FIG. 13 that where it moves downward. In such an optical disc, information is recorded in concentric circular shapes, and the recordings are read out by rotation of the optical disc. Therefore, it is required to perform tracking so that the laser beam may form images along the same circular tracks regardless of vibration and eccentricity of the optical disc. In the prior art, as a means for tracking, mechanical movement of the object lens as a whole or optical deflection by a galvanometer has been employed, and the problems have been involved with respect to response speed and miniaturization of the system.

In the example shown in FIG. 12 and FIG. 13, tracking can be performed very easily by changing the apex angle of the variable apex angle prism corresponding to detected tracking error as shown in the Figures.

In FIG. 12 and FIG. 13, the parallel flat plate glass 20 sandwiching the elastic body 22 is fixed relative to the object lens 19, while the parallel flat plate glass 21 is swingable within the paper plane which is in a radial vector direction of the optical disc, and disposed in the vicinity of the entrance pupil. As shown in the Figures, the apex angle of the variable apex angle prism is changed, whereby the incident laser beam can be deflected to form constantly images on the same circle by the object lens 19. The optical system shown in FIG. 12 and FIG. 13 can be used for recording and reading for various conventional recording members such as an optical magnetic disc, heat mode recording member using light, etc.

Figure 14:
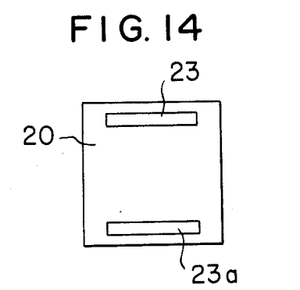
Figure 15:
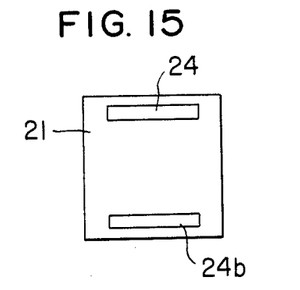
Figure 16:
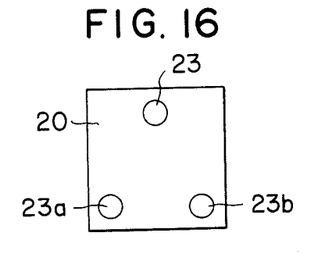
Figure 17:
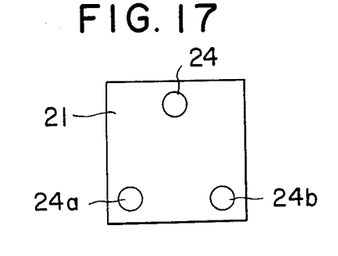

FIG. 14 and FIG. 15 show an example of the variable apex angle prism 18 in FIG. 12 and FIG. 13, FIG. 14 showing its front view and FIG. 15 its back view. Independent electromagnets 23 and 23a are attached to the flat glass plate 20 and ferromagnetic members 24 and 24a such as iron plates are attached to the glass plate 21. Depending on the current applied to the electromagnets 23 and 23a, the attracting forces between 23 and 24 and between 23a and 24a can be controlled, whereby the prism apex angle can easily be controlled. Also, as shown in FIG. 16 and FIG. 17, by providing three sets of combinations of electromagnet and magnetic member, the incident light can be deflected two-dimensionally and the image forming position control along the circular direction, namely the so-called jitter correction can also be effected at the same time. The device shown in FIG. 16 and FIG. 17 is also effective for two-dimensional optical scanning of a minute medium such as microfilm.

Also, in FIG. 12 and FIG. 13, the parallel flat plate glass 21 can be made not only swingable within the paper plane but also movable in parallel with the optical axis, thereby making the incident beam not parallel but convergent or divergent light. Thus, the function of controlling the image forming position in the optical axis direction, namely the automatic focus controlling function can be added.

Figure 18:
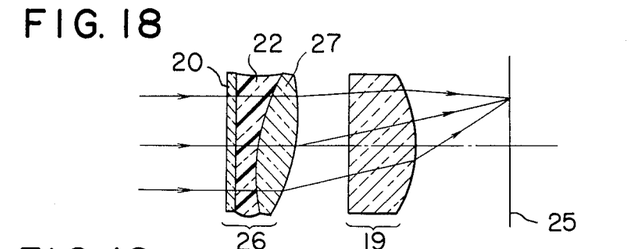
FIG. 18 and FIG. 19 are sectional views of a modification of the optical system shown in FIG. 12.
Figure 19:
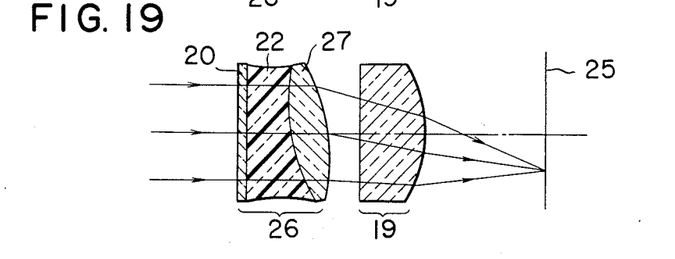

FIG. 18 and FIG. 19 show a device 26 wherein the parallel flat plate glass 21 is replaced with a lens 27. Also, in this case, similarly as in the example shown in FIG. 12, tracking is possible by swing of the lens 27 within the paper plane, and focus control can be done by the parallel oovement in the optical axis direction of the lens 27 as shown in the Figures.

Figure 20:
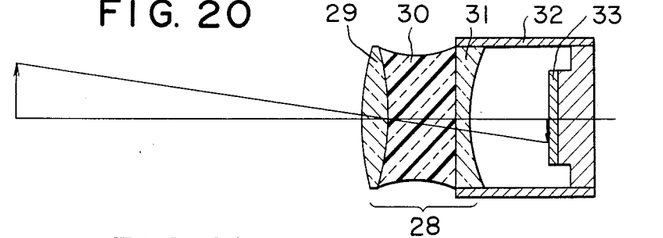
FIG. 20 and FIG. 21 are sectional view of another optical system for which the optical device of the present invention is applied.
Figure 21:
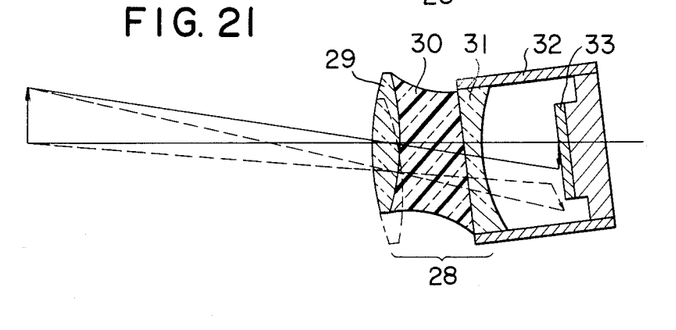

FIG. 20 shows an example in which the device of the present invention is employed for an anti-vibration optical system, and an optical device of the present invention 28 consists of lenses 29 and 31 and the elastic body 30. The lens 31 and a sensor plane 33 such as image pick-up tube are fixed onto a barrel 32. Suppose now that the barrel 32 is slanted as shown in FIG. 21 when an image of object is being formed on the sensor plane 33 as shown in FIG. 20. At that time, if the lens 29 is slanted similarly, the image position on the sensor plane will be deviated greatly as shown by the dotted line in FIG. 21 to result in an awkward trembling of the image. However, in the present invention, by using a material as described above as the elastic body 30, the lens 29 will not change its position greatly. This is because the above-mentioned material has so called visco-elastic properties and abrupt deformation can be prevented owing to such visco-elastic properties. Accordingly, as shown by the solid line in FIG. 21, abrupt change in image position on the sensor plane can be alleviated. Further, when a certain time elapses under the slanted state as shown in FIG. 21, the position of the lens 29 will gradually approach toward the dotted line shown in the Figure through elasticity of the elastic doy. Therefore, even with the abrupt vibration or movement of the optical system, the image obtained by the sensor moves always slowly to give a stable image.

Figure 22:
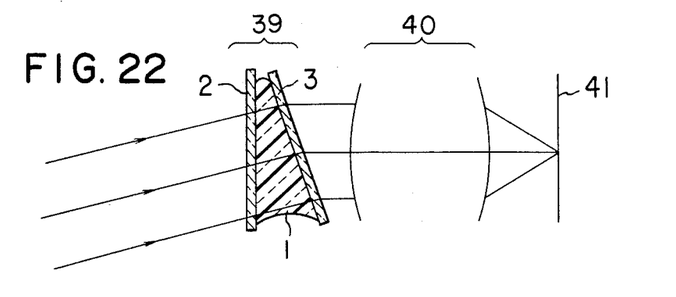
FIG. 22 and FIG. 23 are sectional views of an anti-vibrational optical system for which the device of the present invention is applied.
Figure 23:
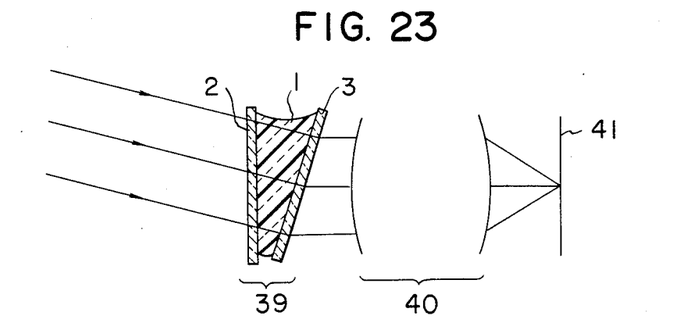

FIG. 22 and FIG. 23 also show an example applied for an anti-vibration optical system which comprises a variable apex angle prism 39 as explained in FIGS. 1 and 2, a photographing lens 40 and a sensor plane 41 such as an image pick-up tube, etc. In this example, vibration or trembling during walking photographing or panning is detected, and correspondingly the apex angle of the variable apex angle prism 39 disposed nearer to the side of the object than the lens 40 is changed to slant the optical axis of the photographing optical system as a whole, thereby obviating vibration or trembling of the image formed on the sensor plane 41.

In the above description, embodiments having two optical surfaces capable of changing their relative positions have been described, but it is clear that the present invention can be applied for devices comprising multiple optical surfaces such as pentaprism, etc. Furthermore, in place of glass plates or lenses those made of plastics may be used.

As described above, the present invention provides a device with a simple structure while giving a large change in relative positions of two or more optical surfaces and therefor it can be effectively utilized for various optical systems.

EXAMPLE

Figure 24:
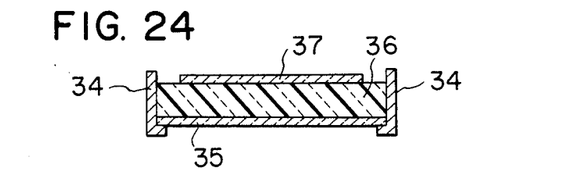
FIG. 24 and FIG. 25 are a sectional view and a plan view of the optical device shown in a working Example.
Figure 25:
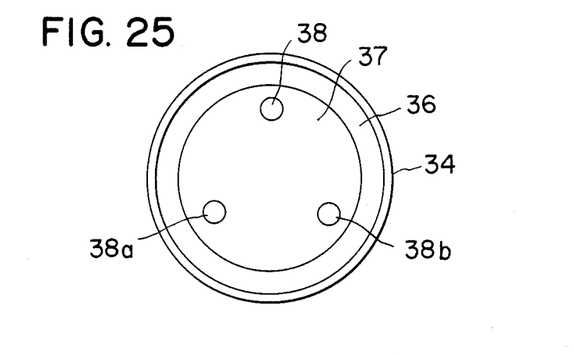

As shown in FIG. 24 an elastic body 36 of a silicone rubber (trade name: KE 104 gel; produced by Shinetsu Kagaku K.K.) having a thickness of 7 mm was encased in an aluminum container in which a glass plate 35 with a thickness of 2 mm and an outer diameter of 50 mm was placed at the bottom, and a glass plate 37 with a thickness of 2 mm and an outer diameter of 40 mm was placed thereon. The silicone rubber was bonded to the glass plates 35 and 37 with a silane coupling agent. The glass plates 35 and 37 had a refractive index of 1.52 and the silicone rubber 36 a refractive index of 1.40. On the glass plate 37, three permanent magnets 38, 38a and 38b were bonded and three electromagnets were provided beneath the glass plate 35 as opposed to the respective permanent magnets. By changing the current applied to the respective electromagnets, the glass plate could be slanted within a range of from 0° to ±10°. Under this state, when the light is permitted to enter perpendicularly to the bottom glass plate 35, the deflection angle of the light emitted from the glass plate 37 could be changed within a range of from 0° to ±4°.

What is claimed is:

1. An optical device comprising an elastomeric body, and a plurality of relatively rigid holding members each providing an optical surface and holding in cooperation with each other the elastomeric body, the relative positions of the plurality of optical surfaces being changeable through deformation of the elastic body.

2. An optical device according to claim 1, wherein the relatively rigid holding members are two in number and disposed to sandwich the elastomeric body.

3. An optical device according to claim 2, wherein the relatively rigid holding members are parallel flat plate glasses.

4. An optical device according to claim 2, wherein one of said relatively rigid holding members is provided with an electromagnet and the other with a magnetic member, the relative positions of the two optical surfaces being changeable by changing the current applied to said electromagnet.

5. An optical device according to claim 3, wherein the apex angle formed by the two flat plate glasses is changed through deformation of said elastomeric body.

6. An optical device according to claim 2, wherein each of the relatively rigid holding members is a lens.

7. An optical device according to claim 2, wherein one of the relatively rigid holding members is a flat plate glass and the other is a lens.

8. An optical device according to claim 2, wherein said elastomeric body is covered with a piezo-elastomeric film so that said elastic body is deformed by application of a voltage to said piezoelectric film.

9. An optical device according to claim 1, wherein the elastomeric body has a modulus of elasticity of $10^8$ dyne/cm$^2$ or less.

10. An optical device according to claim 9, wherein the elastomeric body has a modulus of elasticity of $10^6$ dyne/cm$^2$ or less.

11. An optical device according to claim 1 in combination with an object lens system disposed adjacent to said optical device, wherein said optical device and said object lens system together form an optical system capable of varying an image forming position.

12. An optical device, comprising a first relatively rigid holding member, a first elastomeric body, a second relatively rigid holding member, a second elastomeric body, and a third relatively rigid holding member, arranged in the order named, so that said first elastomeric body is sandwiched between the first and second holding members, and said second elastomeric body is sandwiched between the second and third holding members; the relative positions of the first and second holding members being changeable through deformation of said first elastomeric body, the relative positions of the second and the third holding members being changeable through deformation of said second elastomeric body, said first and second elastomeric bodies having different dispersion characteristics from each other.

13. An optical device according to claim 12, wherein the second holding member has a curved optical surface.

14. An optical deflection device, comprising:
an elastomeric body and a plurality of substantially rigid holding members, each holding member providing an optical surface and holding in cooperation with each other the elastomeric body, wherein the optical deflection device has an optical axis extending through the elastomeric body and at least one of the holding members is swingable about an axis extending perpendicular to the optical axis whereby light incident on at least one of the holding members is variably deflected due to the swing.

15. An optical deflection device according to claim 14, wherein said plurality of holding members comprise two flat glass plates.

16. An optical deflection device according to claim 15, wherein one of the two flat glass plates is provided with an electromagnet and the other is provided with a magnetic member, wherein at least one of the flat glass plates is swung by changing a current supplied to the electromagnet.

17. An optical deflection device according to claim 14, wherein at least one of the plurality of holding members comprises a lens.

18. An optical deflection device according to claim 14, wherein the elastomeric body has a modulus of elasticity of $10^8$ dynbe/cm$^2$ or less.

19. An optical deflection device according to claim 18, wherein the elastomeric body has a modulus of elasticity of $10^6$ dyne/cm$^2$ or less.

20. An optical deflection device, comprising:
an elastomeric body and a plurality of substantially rigid holding members, each holding member providing an optical surface and holding in cooperation with each other the elastomeric body, wherein the optical deflection device has an optical axis extending through the elastomeric body and at least one of the holding members is a lens movable in a direction perpendicular to the optical axis so that light incident on the lens is variably deflected to move an imaging position perpendicularly to the optical axis.

21. An optical deflection device according to claim 20, wherein the elastomeric body has a modulus of elasticity of $10^8$ dyne/cm$^2$ or less.

22. An optical deflection device according to claim 21, wherein the elastomeric body has a modulus of elasticity of $10^6$ dyne/cm$^2$ or less.

23. A method of varying an image forming position, which comprises providing an optical system comprising an elastomeric body and two relatively rigid holding members each providing an optical surface and sandwiching the elastomeric body, and changing the relative positions of the optical surfaces through deformation of the elastomeric body to vary the image forming position.

* * * * *

UNITED STATES PATENT AND TRADEMARK OFFICE
CERTIFICATE OF CORRECTION

PATENT NO. : 4,781,445
DATED : November 1, 1988
INVENTOR(S) : TAKESHI BABA, ET AL.

Page 1 of 3

It is certified that error appears in the above-identified patent and that said Letters Patent is hereby corrected as shown below:

AT [57] IN THE ABSTRACT

Line 6, "distnace" should read --distance--.

COLUMN 1

Line 23, "etc" should read --etc.--.

COLUMN 2

Line 13, "view" should read --views--.
Line 31, "far" should read --long--.
Line 34, "bers" should read --bers.--.

COLUMN 3

Line 1, "material" should read --materials--.
Line 22, "or" should read --of--.
Line 40, "Browian" should read --Brownian--.

COLUMN 4

Line 17, "miroconsistometer" should read --microconsistometer--.
Line 29, "valcan-" should read --vulcan- --.
Line 41, "Kogyo K.K." should read --Kogyo K.K.)--.
Line 44, "increased" should read --increases--.

UNITED STATES PATENT AND TRADEMARK OFFICE
CERTIFICATE OF CORRECTION

PATENT NO. : 4,781,445

DATED : November 1, 1988

INVENTOR(S) : TAKESHI BABA, ET AL.              Page 2 of 3

It is certified that error appears in the above-identified patent and that said Letters Patent is hereby corrected as shown below:

COLUMN 5

Line 12, "tis" should read --its--.
    Line 28, "prims" should read --prism--.
    Line 36, "FIG. 2 a" should read --FIG. 2 shows the--.
    Line 46, "and," should read --and--.

COLUMN 6

Line 33, "changed." should read --changes.--.
    Line 39, "ay" should read --may--.
    Line 58, "vice 16" should read --vice 13--.

COLUMN 7

Line 11, "disirable" should read --desirable--.
    Line 21, "for pick-up" should read --for a pick-up--.
    Line 21, "an" should read --a--.
    Line 34, "of laser" should read --of the laser--.

COLUMN 8

Line 29, "oovement" should read --movement--.
    Line 46, "so called" should read --so-called--.
    Line 54, "doy." should read --body--.

UNITED STATES PATENT AND TRADEMARK OFFICE
CERTIFICATE OF CORRECTION

PATENT NO. : 4,781,445

DATED : November 1, 1988

INVENTOR(S) : TAKESHI BABA, ET AL.

Page 3 of 3

It is certified that error appears in the above-identified patent and that said Letters Patent is hereby corrected as shown below:

COLUMN 9

Line 7, "as pentaprism," should read --as a pentaprism,--.
Line 13, "therefor" should read --therefore--.
Line 17, "FIG. 24" should read --FIG. 24,--.
Line 66, "piezo-elastom-" should read --piezoelectric--.
Line 67, "eric" should be deleted.
Line 67, "elastic" should read --elastomeric--.

COLUMN 10

Line 56, "$10^8$ dynbe/cm$^2$" should read --$10^8$ dyne/cm$^2$--.

Signed and Sealed this

Eleventh Day of April, 1989

Attest:

DONALD J. QUIGG

Attesting Officer

Commissioner of Patents and Trademarks